United States Patent

Noda

[11] Patent Number: 5,920,717
[45] Date of Patent: Jul. 6, 1999

[54] METHOD AND APPARATUS FOR AUTOMATED PROGRAM-GENERATION

[75] Inventor: Natsuko Noda, Tokyo, Japan

[73] Assignee: NEC Corporation, Tokyo, Japan

[21] Appl. No.: 08/768,434

[22] Filed: Dec. 18, 1996

[30] Foreign Application Priority Data

Dec. 20, 1995 [JP] Japan .................................. 7-331280

[51] Int. Cl.⁶ ........................................... G06F 15/18
[52] U.S. Cl. .................... 395/701; 395/703; 395/705; 364/274
[58] Field of Search ............................. 395/701, 703, 395/705, 500; 364/274, 274.1, 274.5

[56] References Cited

U.S. PATENT DOCUMENTS

| | | | |
|---|---|---|---|
| 4,949,253 | 8/1990 | Chigira et al. | 395/500 |
| 5,038,296 | 8/1991 | Sano | 395/51 |
| 5,084,813 | 1/1992 | Ono | 395/703 |
| 5,133,063 | 7/1992 | Naito et al. | 395/500 |

FOREIGN PATENT DOCUMENTS 5250174  9/1993  Japan .

OTHER PUBLICATIONS

T. Yamanouchi et al.; "Software Synthesis Shell SOFTEX/S"; I.E.E.E. (1992), pp. 28–37.

Primary Examiner—Thomas R. Peeso
Assistant Examiner—Demetra R. Smith
Attorney, Agent, or Firm—McGinn & Gibb, P.C.

[57] ABSTRACT

An automated program-generating apparatus, includes a program-generating section for receiving an input specification and for transforming the input specification into an output program. A reference device external to the program-generating section is available for referencing by the program-generating section. Metarules in the program-generating section operate with the reference device to transform the input specification into the output program.

21 Claims, 8 Drawing Sheets

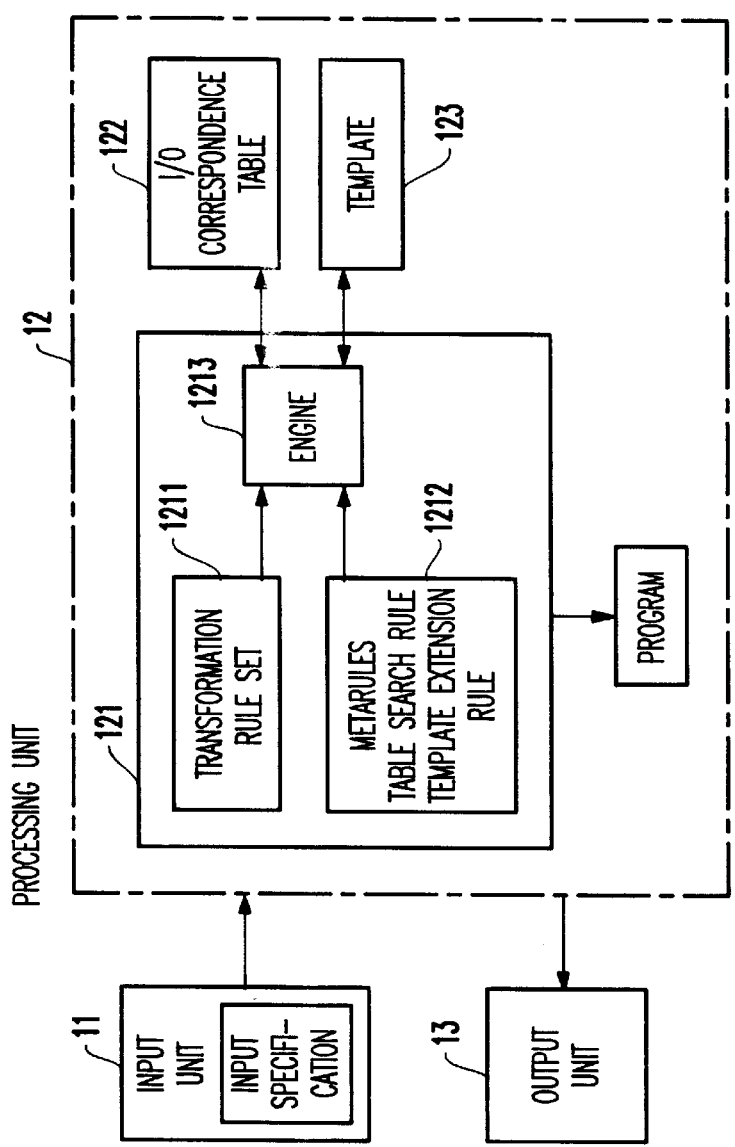

```
classes(
    class(
        classA,
        ObjectA,
        {int Attr1;char* Attr2;},
        {void foo1(); int foo2(int n,char* c);}
    ),
    class(
        classB,
        ObjectB,
        {int Attr3;},
        {void foo3();}
    ),
    class(
        classC,
        ObjectC,
        {char* Attr4;},
        {char* foo4(int n);}
    )
)
```

FIG.5 classA.h — 61
```
#include "ObjectA.h"

class classA : public ObjectA {
        int Attr1;
        char* Attr2;
        void foo1()
        int foo2(int n,char* c);
};
``` classB.h — 62
```
include <ObjectB.h> class classB : public ObjectB {
        MACRO_1(classB);
        int Attr3;
        void foo3();
};
``` classC.h — 63
```
include <lib/ObjectC.h> class classC : public ObjectC {
        char* Attr4;
        char* foo4(int n);
        MACRO_2(classC);
};
```

FIG.6

| Name | output |
|---|---|
| ObjectA | "ObjectA.h" |
| ObjectB | <ObjectB.h> |
| ObjectC | <lib/ObjectC.h> |

FIG.7

TEMPLATE T_A(S,X,A,M)

```
class %S : public %X {
    %A
    %M
};
```

TEMPLATE T_B(S,X,A,M)

```
class %S : public %X {
    MACRO_1(%S);
    %A
    %M
};
```

TEMPLATE T_C(S,X,A,M)

```
class %S : public %X {
    %A
    %M
    MACRO_2(%S);
};
```

% INDICATES A VARIABLE

FIG.8

| Name | TEMPLATE |
|---|---|
| ObjectA | T_A(S,X,A,M) |
| ObjectB | T_B(S,X,A,M) |
| ObjectC | T_C(S,X,A,M) |

FIG.9

| Name | FileName | TEMPLATE |
|---|---|---|
| ObjectA | "ObjectA.h" | T_A(S,X,A,M) |
| ObjectB | <ObjectB.h> | T_B(S,X,A,M) |
| ObjectC | <lib/ObjectC.h> | T_C(S,X,A,M) |

TRANSFORMATION RULE SET — 10_1

RULE 1:
classes(X,Y,...)
->(file(X),file(Y),...)

RULE2:
file(class(Name,Parent,Attr,Method))
->file_name_body(file_name(Name),include_file(Parent),class_body(Name,Parent,Attr,Method))

RULE3:
file_name(Name)
->"Name.h"

RULE4:
include_file(Name):
->include(include_name(Name))

RULE5:
include_name(Name)
->find(Name,Table1)

RULE6:
include(X)
->#include X

RULE7:
class_body(Name,Parent,Attr,Method)
->extend(Name,Parent,Attr,Method,find(Parent,Table))

RULE8:
file_name_body(Name,Body)
BODY IS PRINTED OUT UNDER FILE NAME OF NAME

METARULES — 10_2

TABLE SEARCH RULE:
find(X,Table)
OUTPUT CORRESPONDING TO INPUT X IS RETRIEVED FROM TABLE TEMPLATE EXTENSION RULE
extend(X1,...,Xk,Template)
VARIABLE IN TEMPLATE IS REPLACED BY X1,... AND Xk TO EXTEND TEMPLATE.

METHOD AND APPARATUS FOR AUTOMATED PROGRAM-GENERATION

BACKGROUND OF THE INVENTION

The present invention generally relates to an automated program-generating apparatus which has transformation rules describing the relationship between the input specification and the output program internally, and generates the program from the input specification according to the transformation rules, and more particularly to an automated program-generating apparatus in which part of the transformation rules are separated as external information, and metarules dynamically switch transformation modes by accessing the information.

DESCRIPTION OF THE RELATED ART

A conventional transformation-based program generator, which is described in Japanese Unexamined Patent Application Disclosure Hei. 5-250174, transforms the input program to an output program by a set of transformation rules which describe the relationship between the input program and the output program. According to the program transformation mode described therein, an input program is subjected to parsing, and is transformed to an output program using a transformation rule set expressed as a set of paired syntax trees.

A first problem of the conventional program generator is that the transformation rule set must be amended each time the form of the input program/specification is extended, or the form of the output program is modified.

In the conventional program generator, a form of the output program, which is generated by transforming the input program is fixed. For example, one program generator outputs the include declaration of C++ program in the form of "#include "FileName"". If a user hopes to output the include declaration in the form of "#include <FileName>", the user must use another program generator. However, thus preparing a different program generator in response to the user's request is inefficient.

Therefore, as shown in the following example, for one program generator to input three types of variables and to output three types of include declarations, the program generator must have three types of transformation rules.

ObjectA →#include "ObjectA.h"
ObjectB →#include <ObjectB.h>
ObjectC →#include <lib/ObjectC.h>

However, the program generator cannot output an include declaration corresponding to an input variable ObjectD, because the program generator does not have the transformation rule for transforming the input variable ObjectD.

As mentioned above, the conventional program generator is fixed by the form of the input program/specification by the variety of transformation rules.

For purposes of this application, "extending the form of the input program/specification" means appending the new input variable (e.g., ObjectD) into the input program/specification.

Further, "modifying the output program" means appending the new output form into the output program or changing the output form of the output program (e.g., "#include "FileName"" to "#include <FileName>").

The reason for such amendments is because the transformation rules must be appended or modified for extending the form of the input specification, and modifying the output program.

A second problem is the difficulty in customizing the transformation rules by the users.

Another problem is that the conventional program generator must have a lot of transformation rules for having a general versatility.

SUMMARY OF THE INVENTION

In view of the foregoing problems of the conventional systems, it is an object of the present invention to provide an automated program-generating method and apparatus for extending the form of the input specification and modifying the form of the output program, without amending the transformation rules.

It is another object of the present invention to provide an automated program-generating method and apparatus which has a general versatility.

In a first aspect, an automated program-generating apparatus and method according to the present invention locate the relationship information between the input specification and the output program outside the program-generating section, and use metarules, which dynamically switch the transformation modes by accessing the information, to generate the output program.

Specifically, an I/O correspondence table 122 representing the correspondence between the input and the output and a template 123 representing the general pattern of the output, are located outside the program-generating section 121, and the metarules 1212 are provided as a table search rule for searching the I/O correspondence table 122 and a template extension rule 123 for extending the template.

The relationship between the input specification and the output program, being located outside the program-generating section 121, may be modified as desired, without recomposing the program-generating section 121.

Since search of the I/O correspondence table 122 and extension of the template 123 are performed according to the metarules 1212, amending the transformation rules is unnecessary, even when it is necessary to extend the form of the input program/specification and to modify the output program.

With the unique and unobvious structure and method of the invention, an automated program-generating apparatus extends the form of the input program/specification and modifies the output program, without amending the transformation rules.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram illustrating the configuration of a first embodiment of the present invention;

FIG. 2 illustrates an input/output (I/O) correspondence table;

FIG. 3 illustrates another I/O correspondence table;

FIG. 5 illustrates an example of an input specification;

FIG. 6 illustrates an example of an output program;

FIG. 7 illustrates a preferred embodiment of an I/O correspondence table;

FIG. 8 illustrates a preferred embodiment of a template;

FIG. 9 illustrates another preferred embodiment of an I/O correspondence table;

FIG. 10 illustrates a preferred embodiment of a transformation rule set;

FIG. 13 illustrates a second preferred embodiment of an I/O correspondence table.

DETAILED DESCRIPTION OF PREFERRED EMBODIMENTS OF THE INVENTION

Figure 4:
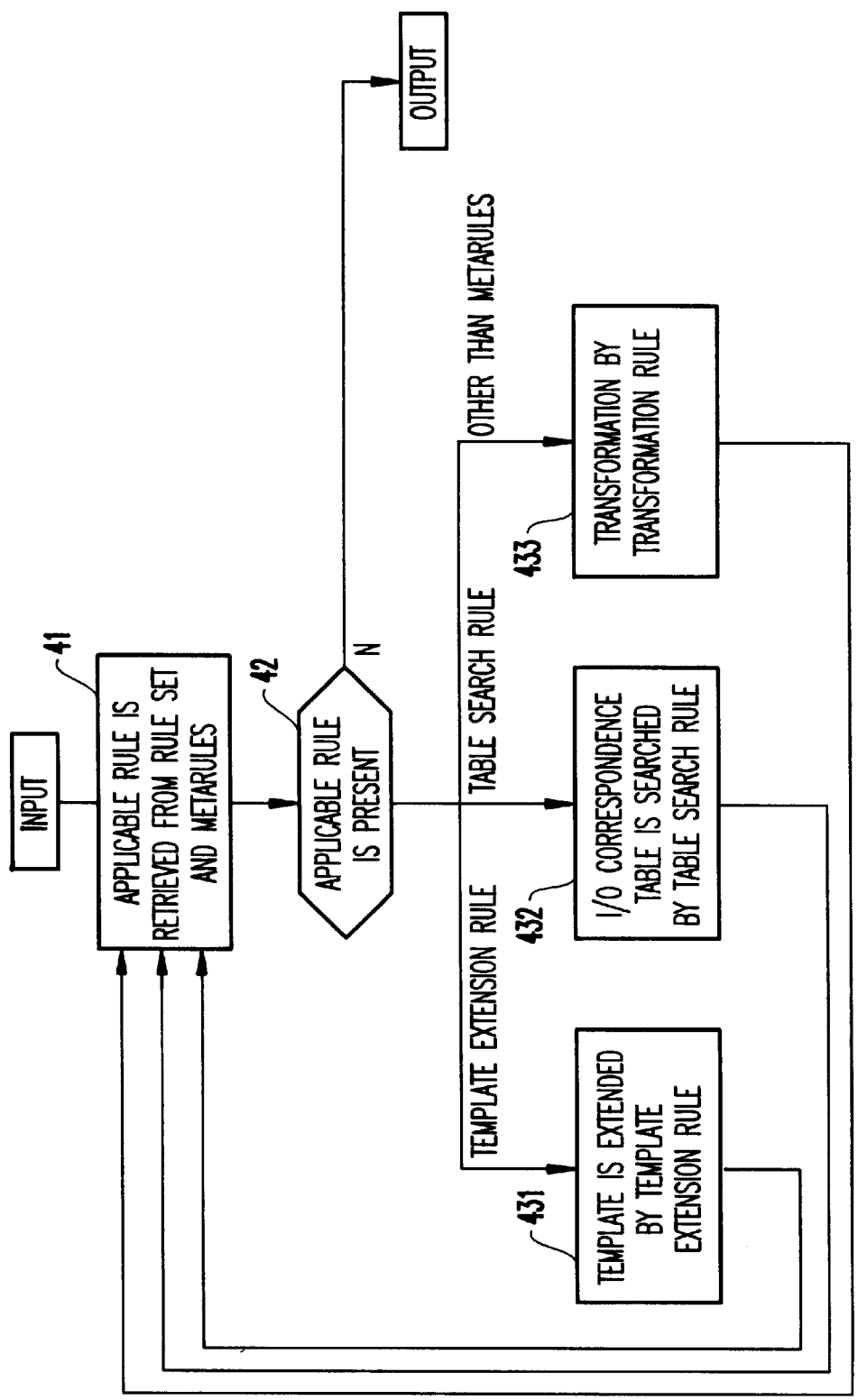
FIG. 4 is a flow chart illustrative of the operation of the present invention.

Referring now to the drawings, and more particularly to FIG. 1, there is shown an embodiment according to the present invention which comprises an input unit 11, such as a keyboard, a joystick, a trackball, a voice input device, or a pointing device, a processing unit 12 which operates under control of a program, and an output unit 13 such as a display (e.g., cathode ray tube, liquid crystal display, etc.) or a printer.

The processing unit 12 is provided with a program-generating section 121, which transforms the input specification to a program while referring to an I/O correspondence table 122 and a template 123 which have been prepared by the user in advance.

The program-generating section 121 has a transformation rule set 1211 as a set of rules which define the transformation mode and two "metarules" (a table search rule and a template extension rule) 1212. The program-generating section also includes an engine 1213 which actually executes the transformation according to the rules. A plurality of transformation patterns are defined in the I/O correspondence table 122 and the template 123. Metarules determine the transformation mode by extracting a specific transformation pattern. That is, metarules control the operation of the automated program-producing apparatus and method according to the present invention.

The transformation rule set 1211 is a set of transformation rules which transform the input specification represented as a string of specifications (i.e., s(X1, ..., Xn)) into the output program. The transformation of the input specification to the output program is executed in a plurality of steps by successive application of the transformation rules.

Hereinafter, the pattern to which a transformation rule is applied in a transformation step is referred to as the "input to the step", while the pattern reprogrammed by application of the transformation rule is referred to as the "output from the step". The input specification, which is input by the program-generating section 121, is the input pattern. This input pattern becomes a condition of the transformation rule, and corresponds to the left column of the I/O correspondence table 122. An action of the transformation rule is the output pattern, becomes the input pattern for other transformation rules, and corresponds to the right column of the, I/O correspondence table 122.

The metarules 1212 include a table search rule for retrieving the output corresponding to the I/O correspondence table 122, and a template extension rule for replacement of variables in the template 123 with input variables. The I/O correspondence table 122 preferably is a reference table for transforming an input specification into a useful output.

Generally, in the invention, an input specification is provided and the metarules are applied. The metarules (e.g., table search rule etc.) operates in a manner similar to the "IF ... (condition), THEN ... (action)" rule. Thereafter, an output pattern is generated. The output pattern may, for example, designate an input pattern and a next table search rule, a general transformation rule, and a template extension rule.

FIG. 2 illustrates an I/O correspondence table 122 for transforming input s(X1, ..., Xn) to output Y, and a subsequence {Xi_1, ..., Xi_k} (where k is an integer greater than 1, but not greater than n) of {X1, ..., Xn} determines Y. The I/O correspondence table 122 is searched according to the table search rule in the metarules 1212, and s(X1, ..., Xn) is transformed to Y. A subsequence is a key for searching the I/O correspondence table 122. The table search rule determines Y by searching the I/O correspondence table 122 with the key.

The template 123 represents the general pattern of the output when the value of the input (from the input specification) determines the value of the output.

More specifically, input s(X1, ..., Xn) is transformed to Y, and the subsequence {Xi_1, ..., Xi_k} (where k is an integer greater than 1, but not greater than n) of {X1, ..., Xn} determines Y. When Y has a pattern represented by u(X1, ..., Xn), the general pattern u(X1, ..., Xn) (X1, ..., and Xn are variables) is the template which corresponds to {Xi_1, ..., Xi_k}. "u(X1, ..., Xn)" represents the general form of templates. The particular form of "u(X1, ..., Xn)" is shown in FIG. 8. "s(Xi, ..., Xn)" is transformed to Y by developing the template according to the template extension rule.

Hereinbelow, a modification of the present embodiment according to the present invention will be described. The modification includes providing the I/O correspondence table 122 which contains a plurality of columns.

When the input specification is transformed to an output program, the input specification {Xi_1, ..., Xi_k} sometimes specifies a plurality of pieces of information which are used in separate transformation steps. This allows one I/O correspondence table, which contains a plurality of columns, to be prepared, without preparing separate I/O correspondence tables 122 for the respective specified pieces of information.

FIG. 3 illustrates an exemplary I/O correspondence table 122 which contains such a plurality of columns. Here, the table search rule which defines search of the I/O correspondence table 122 is a rule which specifies the value of an output when the value of an input and the number of rows in the table are specified.

The operation of the embodiment according to the present invention will now be explained with reference to FIGS. 1 and 4.

The input specification provided by the input unit 11 is transmitted to the processing unit 12. When the input specification is transmitted to the processing unit 12, the engine 1213 in the program-generating section 121 which forms the processing unit 12 refers to the transformation rule set 1211 and the metarules 1212 for successive transformation to generate a program. The transformation operation will be explained in detail below.

When the input specification is assigned to the processing unit 12, the input specification becomes the object of transformation (referred to as the "input"). The engine 1213 retrieves an applicable transformation rule (e.g., a transformation rule which specifies the pattern of the input as a pattern before transformation from the transformation rule set 1211 and the metarules 1212 (steps 41 and 42)). As mentioned above, the input specification, which is input by the program-generating section 121, is the input pattern. This input pattern becomes a condition of the transformation rule. An action of the transformation rule is the output pattern, becomes the input pattern for other transformation rules, and corresponds to the right column of the I/O correspondence table 122. When an applicable transformation rule is found, the engine 1213 executes transformation according to the transformation rule.

For example, when the transformation rule is a template extension rule, a variable in the template is replaced by the inputted variable which extends the template (step 431). For the table search rule, the value of the output which corresponds to the input is retrieved from the I/O correspondence table (step 432).

When the transformation rule is other than the metarules, the input is transformed according to the rule (step 433). The pattern, after being transformed by the engine 1213, is referred to as an "output". The output is the input for the next transformation, and steps 41 through 433 are repeated. It is noted that the transformation rules can be applied in any order (e.g., the order of occurrence of the transformation rules).

In step 42, when no transfomnation rule is left which is applicable to the input, the input has been transformed to the final output program, and the transformation is terminated.

Hereinbelow, an example of the preferred embodiment according to the present invention will be explained referring to the drawings. The example of the present invention is for production of a header file of a C++ program by inputting information on an object diagram which is used in object-oriented design.

FIG. 5 illustrates a text-based expression which represents the information on the object diagram as the input (i.e., the input specification). The expression contains information on class names, parent class names, attributes and operations of the classes which are contained in the object diagram.

Referring to FIG. 5, the object specification contains three classes, classA, classB and classC. For example, regarding classA, its parent class is ObjectA, its attribute includes int-type Attr1 and char*-type Attr2, and its operation includes foo1 where the return value is void, and no argument is present, and foo2 wherein the return value is int, and the arguments are int-type n and char*-type c.

FIG. 6 is a program expected to be generated from the input specification. File 61 under the file name classA.h, file 62 under the file name classB.h and file 63 under the file name classC.h are expected to be generated.

When this input specification is transformed to the output program, an include declaration (first line in each of files 61, 62 and 63, the lines of #include) for the include files, which are determined by the parent class names, must be outputted.

However, for example, since no ordinality (relationship) is found between the parent class names and the way of outputting the file names, and the way of outputting the file names depends on the environment, and for other reasons, users want to change the file names. Accordingly, it is impossible to describe a fixed relationship between the input parent class name and the output file names in the transformation rules. Thus, the transformation between input parent name and output file name is expressed in an I/O correspondence table which is prepared by the user in advance. FIG. 7 illustrates an exemplary I/O correspondence table for the first preferred embodiment.

Additionally, the structure of the class declaration which is outputted changes as the selected parent class changes. The structure of the class declaration is expressed by the exemplary templates shown in FIG. 8. The correspondence between the classes and the templates used is shown in the exemplary I/O correspondence table in FIG. 9.

An exemplary transformation rule set and the exemplary metarules are illustrated in FIG. 10.

Hereinbelow, an operation according to the example will be explained (e.g., following the flowchart of FIG. 4). First, it is assumed that the input specification shown in FIG. 5 was assigned to the processing unit 12.

The engine 1213 searches the transformation rule set 1213 and the metarules 1212. Rule 1 (in FIG. 10) is applicable and the engine 1213 reprograms the input specification according to Rule 1. Similarly, Rule 2 is next applicable and reprogramming is performed according to Rule 2. Reprogramming is accomplished by successively applying the applicable transformation rules in this way.

Figure 11:
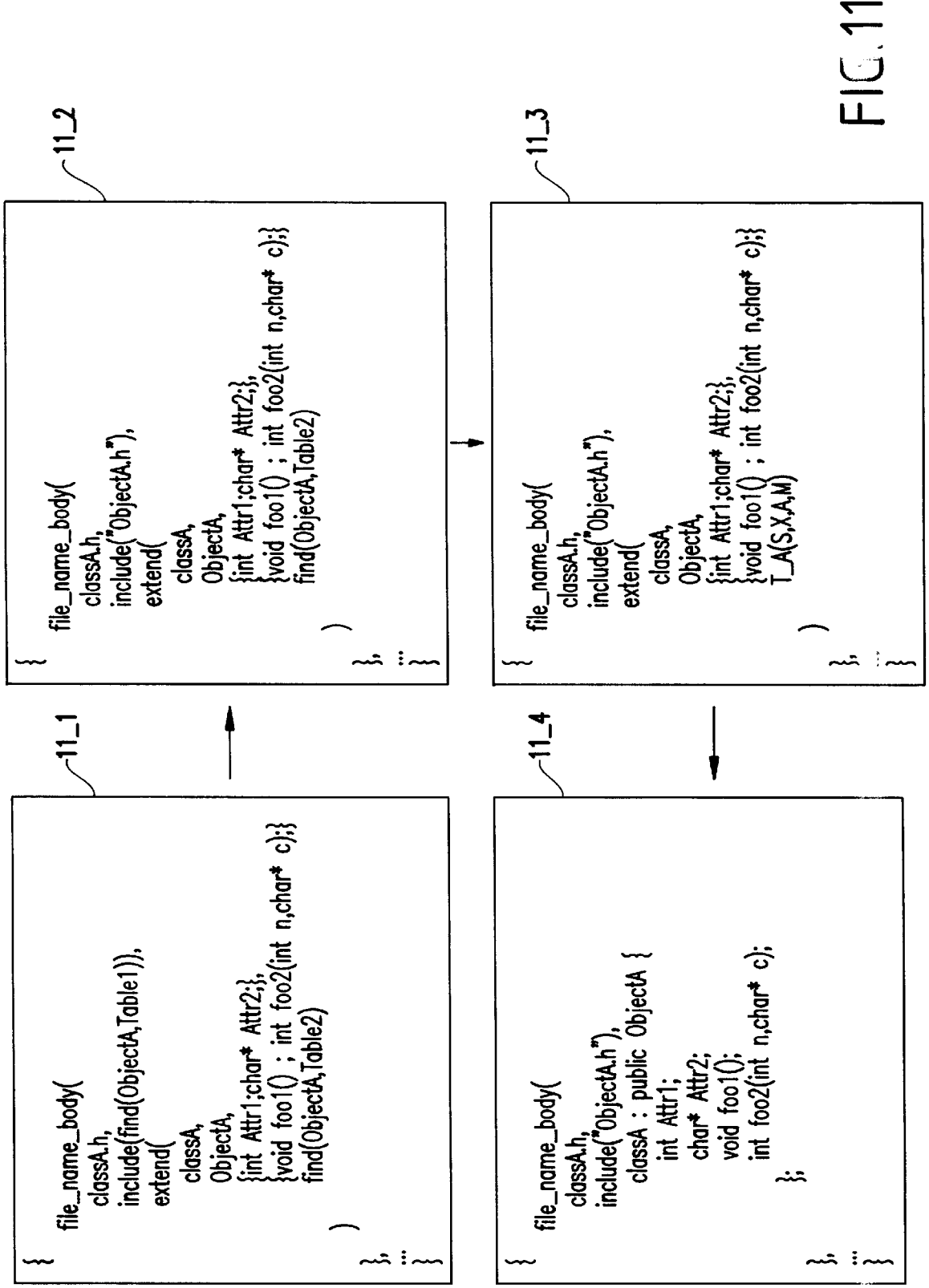
FIGS. 11–12 illustrate an example of the operation of the first embodiment of the present invention.
Figure 12:
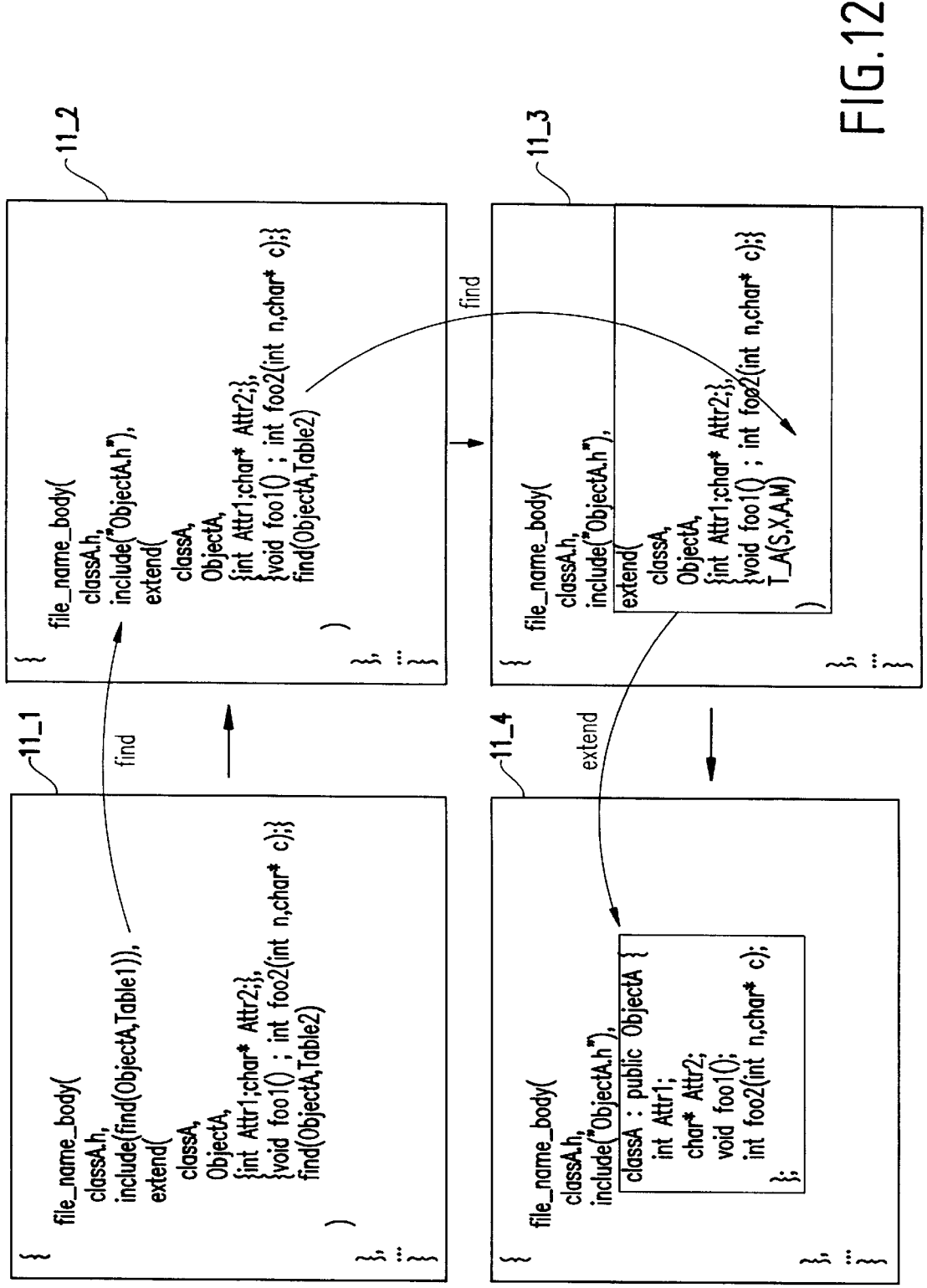

For example, FIGS. 11–12 illustrate the process of reprogramming the input specification. 11_1 illustrates the state of the program after the input specification have been applied to the transformation set rules in FIG. 10 (i.e., the rules in transformation rule set 10_1).

Next, the metarules are applied to the partially developed program. The table search rule ("find" in 10_2) is applicable and, therefore, the I/O correspondence table (FIG. 7) is first searched to generate a correspondence between the parent class names and include file names. Thus, the program is modified with the file name "ObjectA.h" which is included in classA.h, the file name <ObjectB.h> which is included in classB.h, and the file name <lib/ObjectC.h> which is included in the classC.h.

The result of reprogramming the program shown in 11_1 by application of the table search rule (find in 10_2) results in the program 11_2. When program 11_2 is inputted, and a table search rule ("find" in 10_2) is applied. Thus, a template is acquired which has the structure of class declaration which is determined depending on the parent class name. The result of application of the table search rule ("find" in 10_2) to program 11_2 is program 11_3.

A template extension rule ("extend" in 10_2) is applicable to the program in 11_3 and, therefore, the template is extended. The result of application of the template extension rule ("extend" in 10_2) to program 11_3 is program 11_4. Program 11_4 is the output pattern. Then, by application of Rule 8, the results of reprogramming of the input specification are printed out under the respective file names. Thus, the entire transformation is accomplished to generate the program shown in FIG. 6.

As described above, the automated program-generating apparatus of the present invention eliminates the need for amending the transformation rules, even when the form of the input specification is extended, or the form of the output program is modified. As a result, the automated program-generating apparatus has a wider range of applications, and is reusable.

A second embodiment of the present invention is similar to the first embodiment but includes find statements which include three arguments, as opposed to two arguments as in the first embodiment.

Figure 14:
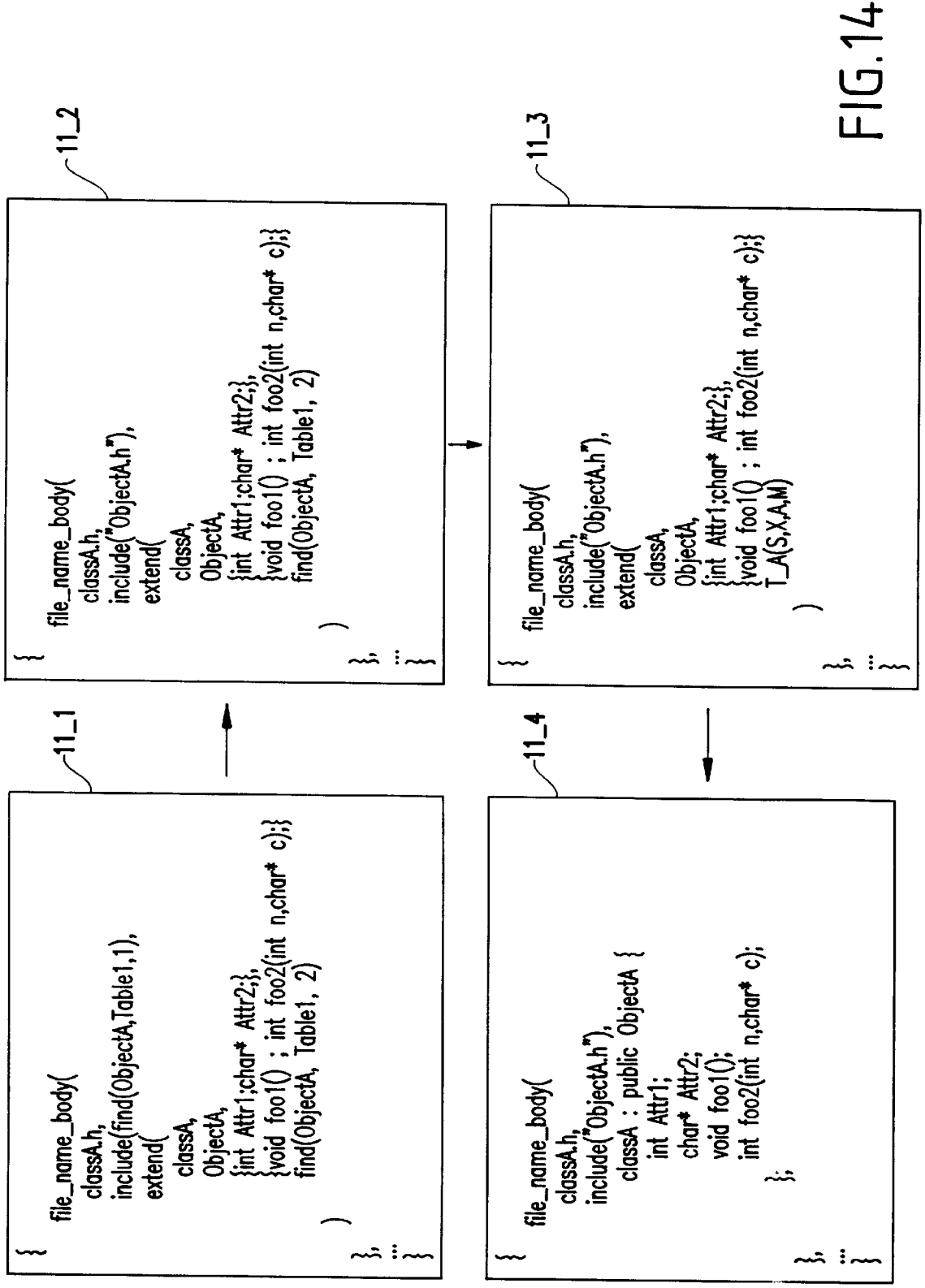
FIG. 14 illustrates an example of the operation of the second embodiment of the present invention.

Specifically, the I/O correspondence table is as shown in FIG. 13 and the process of transformations is as shown in FIG. 14. In contrast to the I/O correspondence table (e.g., Table 1) shown in FIG. 7, the I/O correspondence table shown in FIG. 13 has two outputs. Further, as shown in FIG. 14, the find statements (e.g., ("find(ObjectA,Table1,2") include three arguments. The third argument designates column 2 of Table 1 in FIG. 13. The process of transformations is similar to that of the first embodiment, except for the addition of the third argument, and thus for brevity the transformation process will not be explained further. With the addition of the third argument, the second embodiment has a greater versatility than that of the first embodiment.

Hence, with the invention, the relationship between the input specification and the output program is located outside the program-generating section, and metarules which are referred to for transformation are provided. Thus, the automated program-generating apparatus has a wider range of applications, and is reusable.

The present invention also reduces the number of transformation rules which determine the program-generating section. As a result, the memory required for storing the transformation rules is reduced. This feature results because the relationship between the input specification and the output program is represented with an I/O correspondence table and a template. Thus, the transformation rules need not define everything.

Thus, the invention provides an automated program-generating apparatus which allows extension of the format of the input specification and modification of the style of the output program, without amending the transformation rules.

More concretely, an I/O correspondence table 122 representing the correspondence between the input and the output and a template 123 representing the general pattern of the output are located outside the program-generating section 121. A table search rule for searching the I/O correspondence table 122 and a template extension rule for extending the template are provided as the metarules 1212.

The relationship between the input specification and the output program, being located outside the program-generating section 121, may be modified as desired, without recomposing the program-generating section 121.

Since search of the I/O correspondence table 122 and extension of the template 123 are performed according to the metarules, there is no need to amend the transformation rules even when it is necessary to extend the format of the input specification and to modify the style of the output program.

Additionally, it is noted that the above embodiments of the present invention may be stored as a program or process on a computer-readable media, such as a magnetic media (e.g., hard disk or floppy diskette) or an optical media (e.g., CD-ROM), for implementation with, and executable by, a general-purpose computer. For example, such a media may include a computer-readable medium storing a program for causing the computer to execute steps of: inputting an input specification; and transforming the input specification into an output program by applying metarules to the input specification, the metarules referencing an external table.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An automated program-generating apparatus, comprising:
    a transformer for transforming an input specification into a program; and
    a referencing unit, connected to said transformer and external to said transformer, for being referenced by said transformer,
    wherein said transformer includes transformation rules, metarules and an engine;
    said engine performing:
        an operation (a) of receiving said input specification as an input pattern,
        an operation (b) of selecting a rule out of said transformation rules and said metarules to which said input pattern is applicable,
        an operation (c) of obtaining a first output pattern by executing said rule selected in operation (b) if said rule selected in operation (b) is one of said transformation rules,
        an operation (d) of obtaining a second output pattern by referencing said referencing unit if said rule selected in operation (b) is one of said metarules,
        an operation (e) of repeating the sequence of operations (b) to (d), using a respective one of said first output pattern and said second output pattern obtained in operation (c) or (d) as said input pattern, until any rule to which said input pattern is applicable cannot be found, and
        an operation (f) of outputting as said program said input pattern obtained after operation (e).

2. An apparatus as claimed in claim 1, wherein
    said referencing unit includes an I/O corresponding table and templates;
    said metarules include a table search rule and a template extension rule;
    said transformation rules transform an input pattern into an output pattern;
    said table search rule retrieves an output pattern corresponding to an input pattern from said I/O corresponding table; and
    said template extension rule makes an output pattern by replacing a variable included in a template with a variable included in the input pattern.

3. An apparatus as in claim 1, wherein said metarules comprise variable transformation rules which access said referencing unit.

4. An apparatus as in claim 1, wherein said referencing unit comprises input/output correspondence tables and templates.

5. An apparatus as in claim 4, wherein said input/output correspondence table defines a relationship between said input specification and said output program.

6. An apparatus as in claim 4, wherein said input/output correspondence table defines a relationship between an object name of said input specification and at least one of an output pattern and said template.

7. An apparatus as in claim 6, wherein said metarules access said template corresponding to said relationship defined in said correspondence table.

8. An automated program-generating apparatus, comprising:
    a program-generating section for receiving and transforming an input specification into a program; and
    a referencing unit, external to and connected to said program-generating section, for being referenced by said program-generating section,
    wherein said program-generating section includes metarules for dynamically switching between transformation modes, thereby to convert said input specification into said output program through transformation, transformation rules, and an engine;
    said engine:
        (a) receiving said input specification as an input pattern,
        (b) selecting a rule out of said transformation rules and said metarules to which said input pattern is applicable, (c) obtaining a first output pattern by executing said rule selected in operation (b) if said rule selected in operation (b) is one of said transformation rules, (d) obtaining a second output pattern by referencing said referencing unit if said rule selected in operation (b) is one of said metarules, (e) repeating the sequence of operations (b) to (d), using a respective one of said first output pattern and said second output pattern obtained in operation (c) or (d) as said input pattern, until any rule to which said input pattern is applicable cannot be found, and (f) outputting as said program said input pattern obtained after operation (e).

9. An apparatus as in claim 8, wherein said metarules comprise variable transformation rules.

10. An apparatus as in claim 9, wherein said referencing unit comprises an input/output correspondence table and a template.

11. An apparatus as in claim 10, wherein said input/output correspondence table defines a relationship between said input specification and said output program.

12. An apparatus as in claim 10, wherein said input/output correspondence table defines a relationship between an object name of said input specification and at least one of an output pattern and said template.

13. An apparatus as in claim 11, wherein said metarules extend said template corresponding to said relationship defined in said correspondence table.

14. A method of automating program generation, said method comprising:

inputting an input specification;

transforming said input specification into a program by applying metarules to said input specification, said metarules referencing an external table; and using an engine, said engine:
  (a) receiving said input specification as an input pattern,
  (b) selecting a rule out of said transformation rules and said metarules to which said input pattern is applicable,
  (c) obtaining a first output pattern by executing said rule selected in operation (b) if said rule selected in operation (b) is one of said transformation rules,
  (d) obtaining a second output pattern by referencing said referencing unit if said rule selected in operation (b) is one of said metarules,
  (e) repeating the sequence of operations (b) to (d), using a respective one of said first output pattern and said second output pattern obtained in operation (c) or (d) as said input pattern, until any rule to which said input pattern is applicable cannot be found, and
  (f) outputting as said program said input pattern obtained after operation (e).

15. A method as in claim 14, wherein said transforming step includes a step of switching transformation modes by said metarules based on a content of said external table.

16. A method as in claim 14, wherein said external table comprises input/output correspondence tables and templates.

17. A method as in claim 16, wherein said metarules comprise variable rules which access said template based on a relationship defined in said input/output correspondence table.

18. A method as in claim 14, wherein said transforming step comprises a step of applying a transformation rule set to said input specification, wherein said transformation rule set is separate from said external table.

19. A method as in claim 14, wherein said external table defines a relationship between said input specification and said output program.

20. A computer-readable medium storing a program for causing said computer to execute the following:

inputting an input specification;

transforming said input specification into a program by applying metarules to said input specification, said metarules referencing an external table; and using an engine, said engine:
  (a) receiving said input specification as an input pattern,
  (b) selecting a rule out of said transformation rules and said metarules to which said input pattern is applicable,
  (c) obtaining a first output pattern by executing said rule selected in operation (b) if said rule selected in operation (b) is one of said transformation rules,
  (d) obtaining a second output pattern by referencing said referencing unit if said rule selected in operation (b) is one of said metarules,
  (e) repeating the sequence of operations (b) to (d), using a respective one of said first output pattern and said second output pattern obtained in operation (c) or (d) as said input pattern, until any rule to which said input pattern is applicable cannot be found, and
  (f) outputting as said program said input pattern obtained after operation (e).

21. A program storage device readable by machine, tangibly embodying a program of instructions executable by the machine to perform a method for automated program generation, said method comprising:

inputting an input specification;

transforming said input specification into a program by applying metarules to said input specification, said metarules referencing an external table; and using an engine, said engine:
  (a) receiving said input specification as an input pattern,
  (b) selecting a rule out of said transformation rules and said metarules to which said input pattern is applicable,
  (c) obtaining a first output pattern by executing said rule selected in operation (b) if said rule selected in operation (b) is one of said transformation rules,
  (d) obtaining a second output pattern by referencing said referencing unit if said rule selected in operation (b) is one of said metarules,
  (e) repeating the sequence of operations (b) to (d), using a respective one of said first output pattern and said second output pattern obtained in operation (c) or (d) as said input pattern, until any rule to which said input pattern is applicable cannot be found, and
  (f) outputting as said program said input pattern obtained after operation (e).

* * * * *